Aug. 5, 1952   P. J. M. T. ALLARD   2,605,978
DRUM FOR WINDING CABLE
Filed July 31, 1947
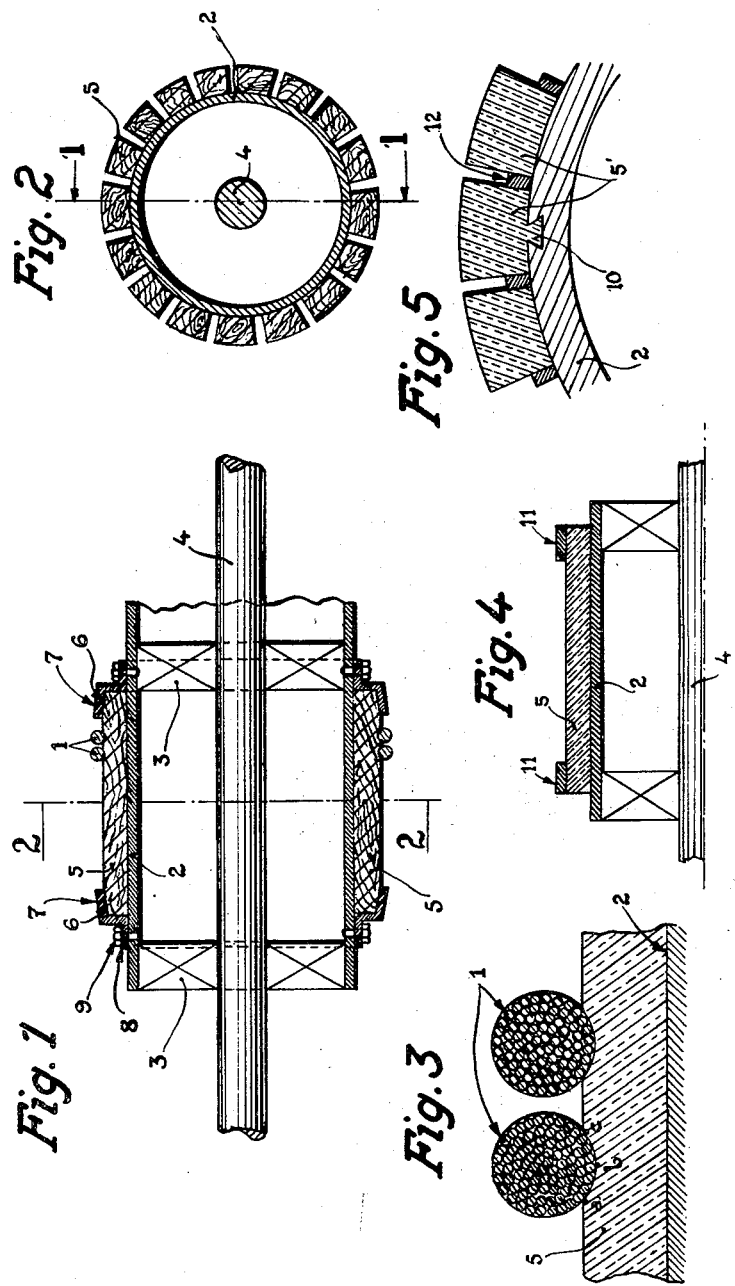
INVENTOR
PIERRE JEAN MARIE THÉODORE ALLARD
BY Otto Munk
HIS ATTY Patented Aug. 5, 1952

2,605,978

UNITED STATES PATENT OFFICE 2,605,978

DRUM FOR WINDING CABLE

Pierre Jean Marie Théodore Allard, Eaubonne, Seine et Oise, France

Application July 31, 1947, Serial No. 765,194
In France June 1, 1946

Section 1, Public Law 690, August 8, 1946
Patent expires June 1, 1966

2 Claims. (Cl. 242—117)

The present invention concerns drums and windlasses used in connection with the winding of cables.

When cables are wound on drums having smooth surfaces, the contact between the cable and the drum is then reduced to a helicoidal line of contact, each straight section of the cable bearing only on one point of the winding surface. Under these conditions, the bearing and therefore the adhesion of the cable on the drum are very light, and the wear occurring is considerable.

In order to secure a proper bearing, it has been proposed to provide the winding surface of the drum with a helicoidal groove of circular section forming a bearing corresponding substantially to a third of the circumference of the cross-section of the cable. However, this arrangement can be used only when the cable to be wound is permanently strained, or when a guiding device is provided to allow for the correct winding of the cable, failing which there is a risk of the cable not winding correctly, thus leaving the groove, and bearing only on the intersection edges of the groove and of the cylindrical surface of the drum.

The present invention permits obtaining automatically a good surface contact between the drum and the cable.

According to the invention, the surface of the drum intended to receive the cable is covered with an elastic coating in which the cable makes its own temporary bed as required.

On account of the strain of the cable, the latter makes its own helicoidal bed in the coating, which deforms elastically, thus securing a good contact surface. When the cable is unwound the coating recovers its initial shape, and is ready for the rewinding of the cable, the spires of which no longer need to reoccupy exactly the same position they had upon the former winding.

Preferably, the elastic coating comprises elements or longitudinal segments, either juxtaposed, or separated by a slight distance which favours the elastic deformation of said elements.

Other characteristics will result from description that follows which should be considered with reference to the accompanying drawings in which:

Fig. 1 is a vertical section, along line I—I of Figure 2, of a drum manufactured according to the invention;

Fig. 2 is a transverse section along line 2—2 of Figure 1;

Fig. 3 is a longitudinal view, partly in section, on a larger scale showing the deformation of one of the elastic elements under pressure of the cable.

Fig. 4 is a longitudinal section of another embodiment;

Fig. 5 is a partial transverse section of another embodiment in which the metal drum includes ribs, the object of which is to separate the elements or elastic longitudinal segments.

According to the embodiment shown in Figs. 1 and 2, the drum intended to receive the cable 1 comprises a metallic cylinder 2, caused to revolve at both ends, by means of roller bearings 3 on shaft 4.

This cylinder can freely rotate, or it may be connected, for example, by an extension of its right end (Fig. 1) to any usual rotating driving device. The drum 2 is covered up with longitudinal segments or slabs 5 preferably slightly separated one from another. These coating elements or slabs 5 are made of elastic, or slightly elastic, material, such as hardened rubber or leather. They are fastened on the cylinder 2, at both ends, slightly beveled at 6, by means of two bushings in the shape of a truncated cone 7 secured to the drum 2 by cylindrical bases 8 and screws 9. Furthermore each element 5 can be secured along its full length on the cylinder 2, by means of gluing, vulcanizing or by a dovetail tailing 10 (Fig. 5) in a longitudinal groove provided in this cylinder. As seen in Fig. 3, when the cable 1 is wound on the drum, due to its tension, it crushes the material of coating elements 5 until the bearing surface reaches a section $abc$ sufficient in area so that the crushing resistance of this material balances the pressure of the cable. The latter bears therefore on a greater surface, which considerably reduces the strain.

Furthermore, due to the composition of element 5, made of hard rubber, wood or leather, the cable does not undergo practically any wear.

In the embodiment of Fig. 4, the longitudinal coating elements 5 are secured on a cylinder 2 simply by means of two cylindrical collars 11.

In the embodiment shown in Fig. 5, elements 5' are separated by ribs 12 integral with the cylinder 2. Due to this construction the elements 5' which, thanks to the grooves thus formed, may be laterally deformed as in fact shown in the example of Fig. 3 are, furthermore, prevented from sliding laterally on the cylinder 2.

The invention as described permits a considerable reduction of the cost of the drum in comparison with drums formed with a helicoidal groove.

Furthermore the elements can be easily changed without it being necessary to change the main part of the drum, thus entailing considerable reduction in maintenance costs.

Having now described my invention what I claim as new and desire to secure by Letters Patent is:

1. A cable winding drum which comprises a cylindrical drum body, spacing ribs rigidly connected with the periphery of said cylindrical drum body, and extending longitudinally and providing grooves therebetween, and a plurality of wearing slabs positioned in said grooves and forming a discontinuous cylindrical surface adapted to engage the cable which is wound on said drum.

2. A cable winding drum as claimed in claim 1, which includes bushings each secured to the periphery of said cylindrical drum body at one end thereof, said bushings covering the corresponding ends of said slabs.

PIERRE JEAN MARIE THÉODORE ALLARD.

REFERENCES CITED

The following references are of record in the file of this patent:

UNITED STATES PATENTS

| Number | Name | Date |
|---|---|---|
| 1,235,504 | Ross | July 31, 1917 |
| 1,570,534 | Sweeney et al. | Jan. 19, 1926 |
| 1,830,890 | Achat | Nov. 10, 1931 |

FOREIGN PATENTS

| Number | Country | Date |
|---|---|---|
| 26,429 | Denmark | July 31, 1920 |